Oct. 18, 1966 W. J. BROWN ETAL 3,280,269

SHAFT POSITIONING SYSTEM

Filed June 28, 1963 7 Sheets-Sheet 1

INVENTORS
W. J. BROWN
R. A. MILLER
H. O. SAUTTER

BY Richard C. Levy
ATTORNEY

Oct. 18, 1966          W. J. BROWN ETAL          3,280,269
                    SHAFT POSITIONING SYSTEM
Filed June 28, 1963                              7 Sheets-Sheet 3

| A-I | B-V | D-III | A-VI-94 | C-IV-94 |
|---|---|---|---|---|
| A-II | B-VI | D-IV | B-I-94 | C-V-94 |
| A-III | C-I | D-V | B-II-94 | C-VI-94 |
| A-IV | C-II | D-VI | B-III-94 | D-I-94 |
| A-V | C-III | A-B | B-IV-94 | D-II-94 |
| A-VI | C-IV | A-I-94 | B-V-94 | D-III-94 |
| B-I | C-V | A-II-94 | B-VI-94 | D-IV-94 |
| B-II | C-VI | A-III-94 | C-I-94 | D-V-94 |
| B-III | D-I | A-IV-94 | C-II-94 | D-VI-94 |
| B-IV | D-II | A-V-94 | C-III-94 | A-B-94 |

Oct. 18, 1966 W. J. BROWN ET AL 3,280,269
SHAFT POSITIONING SYSTEM
Filed June 28, 1963 7 Sheets-Sheet 5

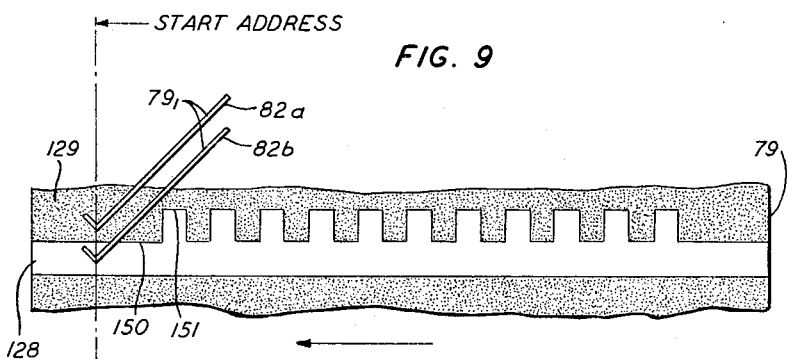
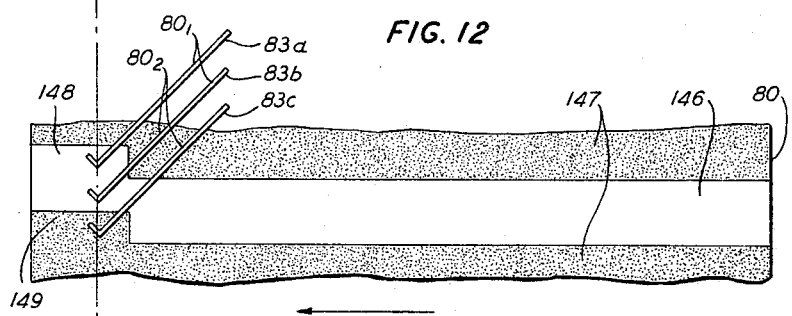
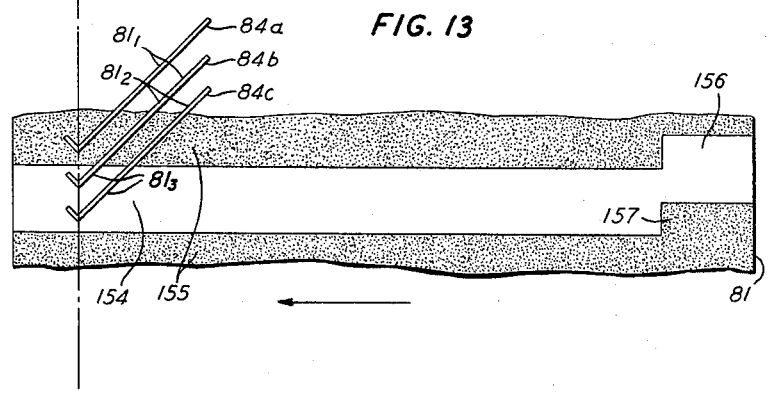

United States Patent Office 3,280,269
Patented Oct. 18, 1966

3,280,269
SHAFT POSITIONING SYSTEM
William J. Brown, Madison, Robert A. Miller, Rumson, and Helmuth O. Sautter, Middletown, N.J., assignors to Bell Telephone Laboratories, Incorporated, New York, N.Y., a corporation of New York
Filed June 28, 1963, Ser. No. 291,485
7 Claims. (Cl. 179—90)

This invention relates to motorized shaft positioning systems, and more particularly, although in its broader aspects not exclusively, to apparatus for selectively rotating a magnetic drum, or other shaft-mounted storage register, to a plurality of predetermined angular positions.

Automatic telephone call transmitters, or repertory dialers as they are otherwise known, invariably include one or more registers which initially store telephone directory numbers, and at a later time selectively introduce these numbers into a telephone line for transmission to a central office. Frequently, owing to a variety of factors not pertinent here, the memory portions of these registers are magnetic in character, comprising such elements as drums, tapes, and the like, which are rotatably mounted for selective angular positioning with respect to a readout device. An index arrangement of some type, for example a nameplate conveyer, is usually associated with the register to display where in the memory the various numbers are stored.

In early dialers of the type discussed above access to a register was accomplished manually, usually by manipulating an externally mounted knob and observing from the indexing device when the correct address was reached. Although this imposed a manual task upon a calling party, such a minor inconvenience was considered a far superior alternative to the procedure generally involved in manually dialing a number. Later, more sophisticated dialers were developed in which initial, or coarse, positioning was accomplished by a motorized drive arrangement, and the final adjustment, which brought the register to the exact address desired, was performed manually, as before. While such combined motorized and manual systems have been found considerably more convenient than their all-manual predecessors, the residual necessity of visually observing the moving index to determine the approximate address of the register was found to impose a severe limitation on dialing speed.

Accordingly, one object of this invention is to automatically drive a shaft mounted element to any one of a number of predetermined rotational positions.

Another object of the invention is to drive a rotatably mounted element to a preselected rotational position by momentarily actuating a switch corresponding to the desired position.

Another object of the invention is to decrease the operating time of telephone repertory dialers.

Still another object of the invention is to simplify the operating procedure of a telephone repertory dialer.

A further object of the invention is to decrease the access time to the storage unit of a telephone repertory dialer.

The objects of the invention are accomplished, broadly, by the provision of a system in which a movable element, the memory device of a storage register for example, is selectively positioned by momentarily operating a switch associated with the desired position. Basically, the invention comprises an element mounted for motion, rotation for example, a plurality of manual switches individually corresponding to different positions to which the element may be moved, means responsive to the operation of a manual switch for initiating movement of the element, means for sensing the position of the element, and means responsive to the sensing means for terminating the movement of the element when its position corresponds to that of an operated manual switch.

One feature of the invention resides in a commutator arrangement which drives an element in rotation to one of several selectable angular positions, senses the approach of the element to the selected position, and terminates rotation of the element at the selected position.

Another feature of the invention resides in a code wheel and sensing arrangement for governing the operation of a magnetic storage register.

Still another feature of the invention resides in a dual-shaft driving system for rotating a magnetic storage drum, one shaft being arranged to drive the drum to a preselected angular position and then disengage, whereupon the other shaft assumes command and drives the drum in accordance with the storage function to be performed.

The foregoing and other objects and features of the invention will be more thoroughly understood by reference to the following detailed description of the invention embodied in a telephone repertory dialing system in conjunction with the accompanying drawing of which:

FIG. 9 is a plan view of a code wheel for controlling the recordation of digits in the storage register of FIG. 8;

FIGS. 12 and 13 are plan views of code wheels which indicate the initial and final address positions, respectively, of the magnetic drum of FIG. 8.

Figure 1:
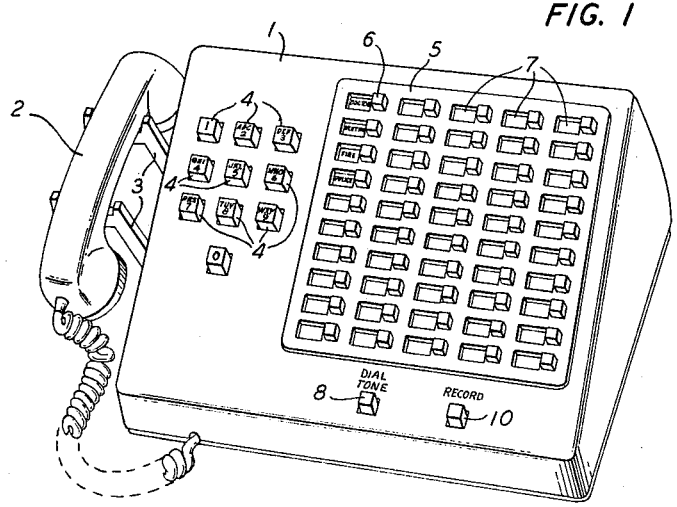
FIG. 1 shows a console housing a telephone set and a repertory dialing system.

With reference to the drawing, FIG. 1 shows a combined telephone set-repertory dialer housed in a single console 1. The speech circuit of the telephone set portion of the console may be of conventional design and include a microphone and receiver housed, as usual, in a telephone handset 2. A pair of cradle arms 3, which support the handset when not in use, protrude from the side of the console and operate a switchhook mechanism to provide off-hook supervision. The console pictured in FIG. 1 employs multifrequency type dialing, that is to say, dialed digits transmitted to the central office comprise coded bursts of frequencies rather than the more conventional series of unidirectional dial pulses. The dialing mechanism comprises a multifrequency oscillator, shown in detail in FIG. 2, which is actuated by an array of keys 4 representing collectively the customary ten dialed digits. It should be understood, however, that the particular signaling arrangement discribed herein is offered by way of illustration and not restriction, the broad aspects of the invention being in no way limited to systems employing multifrequency dialing.

Protruding through a coverplate 5, which overlies most of the right half of the console, is an array of fifty plunger type keys 6, each of which is associated with a memory slot in the dialer which stores a telephone number. As will be explained below, all that need be done to automatically dial a telephone number after that number has been stored, is to depress momentarily the particular one of keys 6 which is associated with the memory slot in which that number is stored. Stamped in the coverplate immediately to the left of each key 6 is a window 7 exposing a tab upon which may be inscribed the telephone number selectable by this key 6. Below coverplate 5 on the face of the console 1 are a pair of keys 8 and 10 which are used during operation of the dialer in its record mode. In particular, depression of RECORD key 10 initiates the operation of storing, or recording, a telephone directory number in the storage register of the dialer. DIAL TONE key 8 conditions the dialer to record "split" directory number, that is to say, a number comprising a prefix dialed to establish a condition, followered by an interval during which a return signal is received to indicate that the condition has been fulfilled, and finally the remaining digits which usually consist of a normal directory number.

Figure 2:
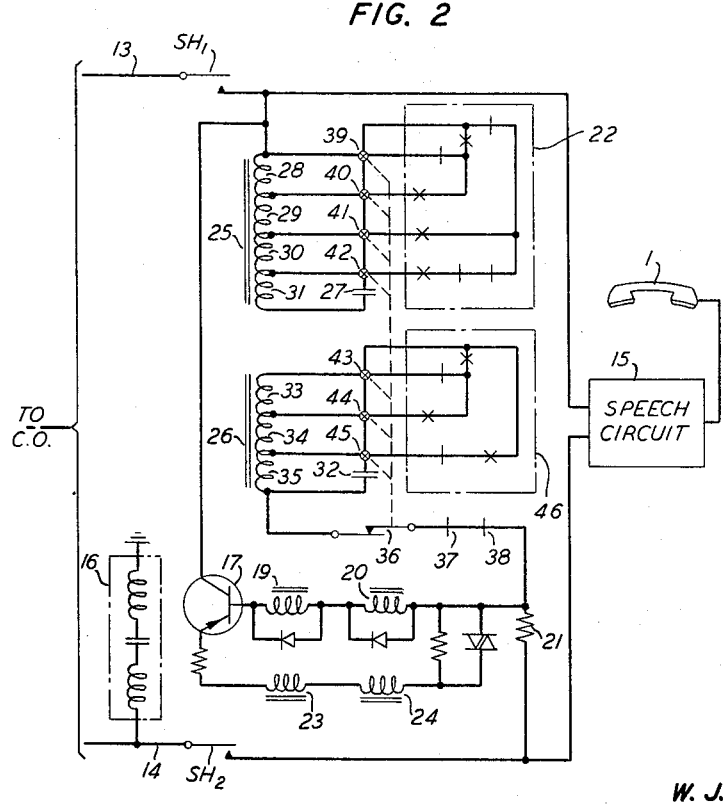
FIG. 2 is a circuit schematic diagram of the telephone set portion of a repertory dialing system.

FIG. 2 is a schematic diagram of the telephone set portion of the combined unit, emphasizing in particular the multifrequency dialing circuit. As shown, a pair of talking conductors 13 and 14, which originate in a telephone central office (not shown), are connected through switchhook operated contacts SH1 and SH2, respectively, to a telephone speech circuit 15 which terminates in the receiver and transmitter of handset 1. A ringer, shown schematically as block 16, is shunted between conductor 14 and ground on the central office side of switchhook contact SH2. Bridged across the station side of the switchhook contacts is a multifrequency dialing oscillator which includes as its active element a transistor 17. The dialing oscillator of FIG. 2 is substantially similar, both in construction and operation, to the dialing oscillator disclosed in copending United States patent application Serial No. 228,581 filed on October 5, 1962 by R. A. Miller and C. M. Taris, now Patent No. 3,243,517, and consequently need not be redescribed in detail herein. Suffice it to say that the base circuit of transistor 17 includes a pair of series coils 19 and 20, the emitter circuit of transistor 17 includes a pair of series coils 23 and 24, and the frequency determining circuit of the oscillator includes a pair of series coils 25 and 26, coils 19, 23 and 25 being wound on a first common core and coils 20, 24 and 26 being wound on a second common core. In order to vary the frequency of the oscillator, coils 25 and 26 are tapped into sections 28 through 31 and 33 through 35, respectively. Accordingly, either the whole or selected subportions of coils 25 and 26 may be connected across capacitors 27 and 32, respectively, to form pairs of tuned circuits depending upon the frequency coding of the dialed digits.

As explained in the aforementioned copending application of Miller and Taris, if dialing is undertaken manually, the various frequency determining tuned circuits of the oscillator are formed by selective closure of crosspoint switches 39 through 45 which are actuated by keys 4 of the dialing mechanism. One example of a key actuated dialing mechanism capable of closing a unique pair of crosspoint switches, such as 39 through 45, for each key of the mechanism is disclosed in copending United States patent application Serial No. 860,549 filed on December 18, 1959 in the names of C. E. Mitchell, R. E. Prescott, L. Schenker and D. G. Tweed now Patent No. 3,109,071. If dialing is undertaken automatically via the repertory dialer portion of the console, the frequency determining circuits are formed through selective operation of the make and break contacts comprising switching matrices 22 and 46, which are respectively associated with coils 25 and 26. Thus, all dial signals, whether manually or automatically initiated, are generated by the oscillator of FIG. 2 for direct application to line conductors 13 and 14.

Figure 3:
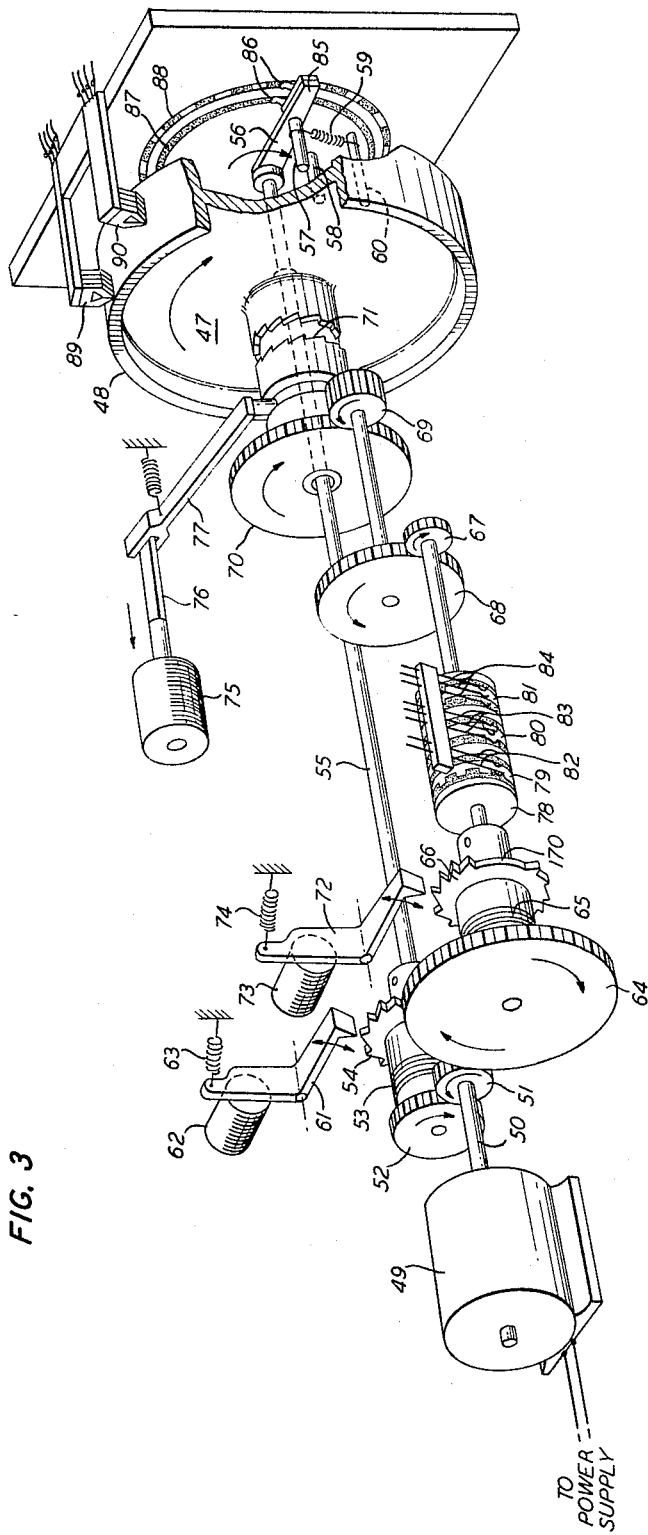
FIG. 3 shows an electromechanical system for selectively positioning a rotatable element, such as a magnetic storage drum of the type useful in telephone repertory dialers.

FIG. 3 illustrates the structural aspects of a motorized system for driving in rotation a magnetic drum storage register, such as might be employed in a telephone repertory dialer. As shown in the drawing, a dual channel, 8-track magnetic drum 47, which stores information circumferentially on a flange 48, is rotated about its center axis by two mutually exclusive drive systems, both of which are powered by shaft 50 of motor 49 through a pinion 51. The first of these drive systems, which in the embodiment of the invention described herein is used for properly positioning the drum as a selected address preparatory to either storing a directory number or extracting a number already stored, comprises a gear 52 enmeshed with pinion 51, a slip clutch 53 and detent wheel 54 following gear 52, and a shaft 55 which is terminated in a wiper arm 56. Projecting rearwardly from wiper arm 56, in a direction parallel to shaft 55, is a pin 57 which drivingly engages a similar pin 58 projecting in a forward direction from drum 47. Pin 57 is held taut against pin 58 by spring 59 which is held in tension by a third pin 60 also projecting forwardly from drum 47. The operation of the first drive system is governed by a latch 61 which is pivotally mounted to engage the teeth of detent wheel 54 under the control of a solenoid 62 and a spring 63.

The second of the aforementioned drive systems, which is used to control the travel of the drum during the transfer of information, comprises a gear 64 enmeshed with pinion 51, a slip clutch 65, a detent wheel 66 and a code cylinder 78 following gear 64, a reduction gear system comprising gears 67 through 70, and a jaw clutch 71 which is integral with drum 47. The operation of the second drive system is governed jointly by a pivotally mounted latch 72 which selectively engages the teeth of detent wheel 66 under the control of solenoid 73 and spring 74, and solenoid 75 which, through its armature 76 and a lever arm 77, urges the opposing jaws of clutch 71 into driving engagement. As shown in the drawing shaft 55 passes freely through gear 70, jaw clutch 71 and drum 47, thereby exerting no direct frictional force on any of these elements. It is to be understood that the various shafts of the drive systems described above are all mounted on suitable bearings (not shown) in a conventional manner which need not be described herein.

Integral with cylinder 78 are three separate code wheels 79, 80 and 81, which have embossed on their periphery distinctive patterns of electrically conductive material. These patterns are shown in detail in FIGS. 9, 12 and 13, respectively, and pertain to the dialer's record mode of operation which is discussed hereinafter. As the code wheels revolve, these patterns are sensed by contact fingers 82, 83 and 84 which apply signals in the form of circuit closures to the circuits which control the directory number recording portion of the dialer.

In addition to applying a rotary force to drum 47 through pin 57, armature 56 also serves as the wiper arm of a commutator device which senses when the drum has reached a selected angular position, or address. The rear surface of wiper arm 56 mounts a conducting plate 85 having a pair of spaced depending contact fingers 86. Fingers 86 engage a pair of concentric rings 87 and 88, the inner ring 87 forming a continuous conductive loop which resides permanently at ground potential and the outer ring 88 comprising a pluraliy of segmented conducting bars. The conducting bars of the outer ring are connected to the circuitry which controls solenoid 62 through an array of contacts that are actuated by address selecting keys 6 (FIG. 1). Although the embodiment of the invention described herein utilizes a commutator type device, it should be apparent to those skilled in the art that other rotary switching devices could be substituted with equal facility.

Figure 4:
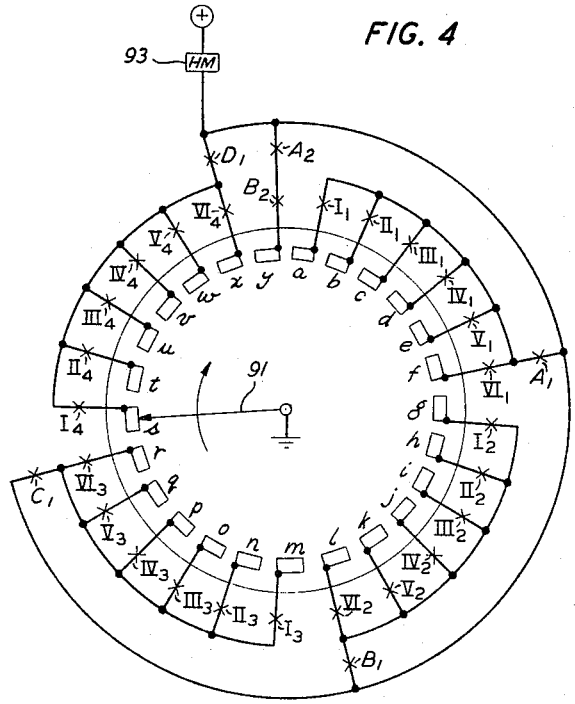
FIG. 4 is a schematic diagram of a commutator arrangement for sensing the angular position of a rotatable element.

FIG. 4 is a circuit diagram of a commutator device such as the one shown structurally in FIG. 3, and associated switching matrix, which selectively applies operating potential to the control circuitry of solenoid 62, thereby to urge latch 61 into engagement with detent wheel 54 and arrest the rotation of drum 47 at an address selected by one of the keys 6. As shown, the outer segmented ring of the commutator device comprises twenty-five conductive bars, respectively labeled by the lower case letters $a$ through $y$, each of which represents a distinct angular position, or address, of the drum. Since the drum consists of two adjacent circumferential channels, each with its own magnetic head 89 or 90, the storage register has an aggregate capacity of fifty selectable addresses, each occupying a circumferential arc of approximately 14.4 degrees, in which directory numbers may be stored. Conducting plate 85 and fingers 86 (FIG. 3), which sequentially apply ground potential to the various conducting bars of the segmented ring, are represented in FIG. 4 by rotating arm 91.

Each of the conducting bars $a$ through $y$ of the segmented ring is connected to a terminal of relay 93 through a pair of make contacts which is unique to an angular position of the drum. Relay 93, through an appropriate pair of make contacts, senses when the drum has reached a rotational position corresponding to a selected address, and initiates a cycle which arrests further drum rotation. In the embodiment of the invention described herein, the various make contacts of FIG. 4 are relay actuated, and are labeled to designate the particular relays to which they respond. In FIG. 4, as in the remaining figures of the drawing, on-line characters represent a particular relay or other actuating element operating a pair of contacts, and subscripts represent a particular pair of contacts associated with that actuating element. For example, in the symbol "$A_1$," "$A$" designates a relay or other switching element, and "1" designates a particular set of contacts actuated by that element.

Figures 5, 6:
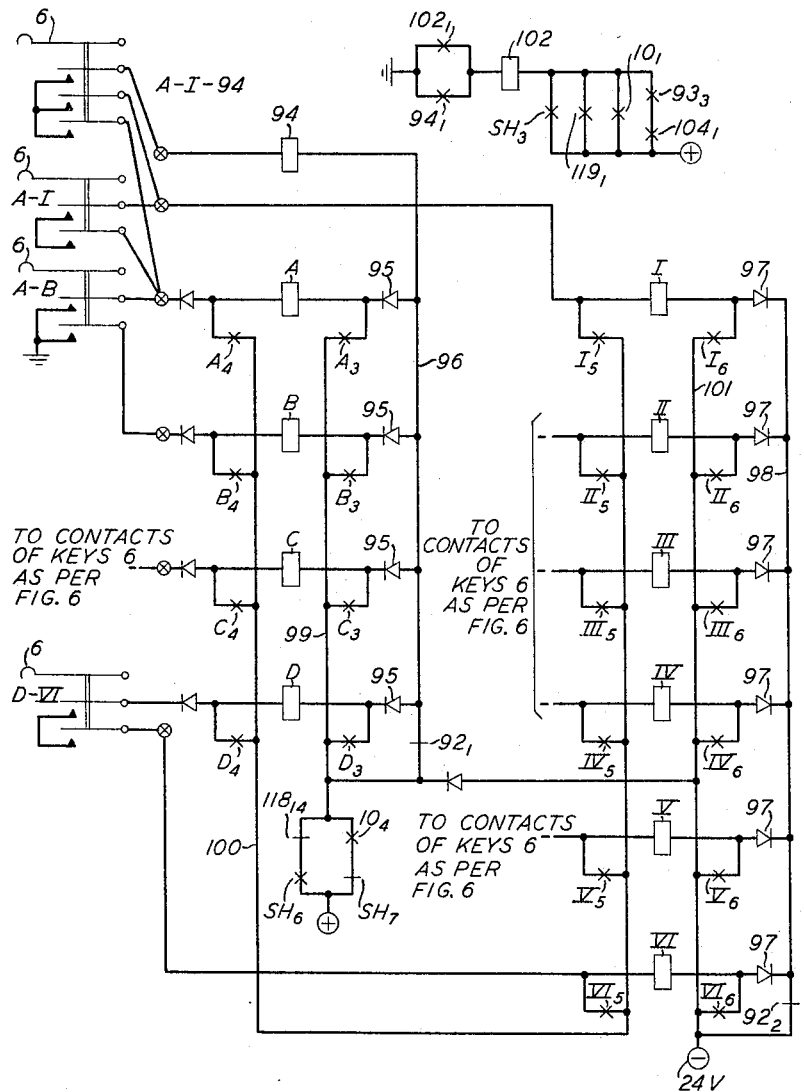
FIG. 5 is a relay switching arrangement in which a unique pair of relays is energized and locked in accordance with the selective operation of a plurality of keys.
FIG. 6 is a chart defining the interconnections between the relays and keys of FIG. 5.

FIG. 5 shows an arrangement of positioning relays which, under the control of address selecting keys 6, actuate the various make contacts of FIG. 4 so as to provide an operating path for relay 93 from ground and arm 91 through the particular commutator bar representing the selected address. The positioning relays are arranged, electrically, in two banks, relays A through D comprising the first bank and relays I through IV comprising the second bank. One terminal of each relay in the first bank is connected to a positive source of potential through a diode 95, conductor 96, break contact $92_1$ and a pair of parallel paths comprising in one branch break contacts $118_{14}$ and make contacts $SH_6$, and in the other branch make contacts $19_4$ and break contacts $SH_7$. One terminal of each relay in the second bank is connected through a diode 97, conductor 98 and break contact $92_2$ to a negative source of potential. The other terminal of each relay in the first bank is connected through two separate address selecting keys 6 to the other terminal of each relay in the second bank. The foregoing arrangement provides means for energizing twenty-four distinct pairs of positioning relays by depressing forty-eight address selecting keys 6, each distinct pair of relays being energizable through two separate keys. Relays A and B of the first bank, which comprise a twenty-fifth distinct pair of positioning relays, are arranged to have their terminals which are remote from the positive source of potential be connectable to ground through two separate address selecting keys 6. In other words, the total of fifty address selecting keys 6 are divisable into two groups of twenty-five keys, each group being able to selectively establish an operating path for relay 93 (FIG. 4) through all of the commutator bars. As will be explained below, each of the above-mentioned groups is associated with a different channel of the two-channel drum 47.

Since drum 47 comprises two twenty-five address channels, each channel having its own magnetic head, it is evident that each single address corresponds to two storage slots, one in each channel. Accordingly, transfer relays 94 and 102 are provided to activate only that head associated with the selected channel. As shown in FIG. 5, one terminal of relay 94 is connected to the positive source of potential through conductor 96 and break contacts $92_1$, and the other terminal is connected in multiple to each of the twenty-five address selecting keys 6 associated with only one of the drum's channels. Relay 102, which responds to relay 94, is connected to ground through shunt make contacts $94_1$ and $102_1$, and is connected to positive potential through four separate parallel paths. The first of these paths comprises switch-hook operated make contacts $SH_3$ which maintains relay 102 energized so long as the handset of the repertory dialer remains off hook. The second of these paths comprises make contacts $119_1$ which serves to maintain relay 102 operated for the full duration of a recording cycle. The third of these paths comprises make contacts $10_1$ which insure that during a record cycle, relay 102 will operate in response to the momentary depression of an address selecting key 6. Finally, the fourth of these paths comprises series make contacts $93_3$ and $104_1$ which maintain relay 102 operated during automatic dialing. Although the specific connections from the positioning and transfer relays to only a few of the fifty address selecting keys are shown, the chart of FIG. 6, in which each square represents the correspondingly positioned key 6 in the five-by-ten matrix of FIG. 1, designates the combinations of relays to which the remaining keys are connected.

Connected to the terminals of each positioning relay is a pair of make contacts which provide an auxiliary current path for locking a pair of positioning relays in the operated condition after an address selecting key 6 has been released. Specifically, a conductor 99 connects the positive source of potential to one terminal of each of the positioning relays A, B, C and D through make contacts $A_3$, $B_3$, $C_3$ and $D_3$, respectively, and a conductor 100 is connected to the other terminal of each of the previously mentioned positioning relays through companion make contacts $A_4$, $B_4$, $C_4$ and $D_4$. Conductor 100 is also connected to a terminal of each of the positioning relays I, II, III, IV, V and VI through make contacts $I_5$, $II_5$, $III_5$, $IV_5$, $V_5$ and $VI_5$, respectively, and the other terminal of each of the last-mentioned positioning relays is connected through a companion make contact $I_6$, $II_6$, $III_6$, $IV_6$, $V_6$ and $VI_6$ to a conductor 101 which terminates in the negative source of potential. In other words, the positioning relays of the first bank, together with a series pair of make contacts, are connected in shunt with each other across conductors 99 and 100, the positioning relays of the second bank, together with a series pair of make contacts, are connected in shunt with each other across conductors 100 and 101, and the above two shunt groups are connected in series with each other between the positive and negative sources of potential.

Figure 7:
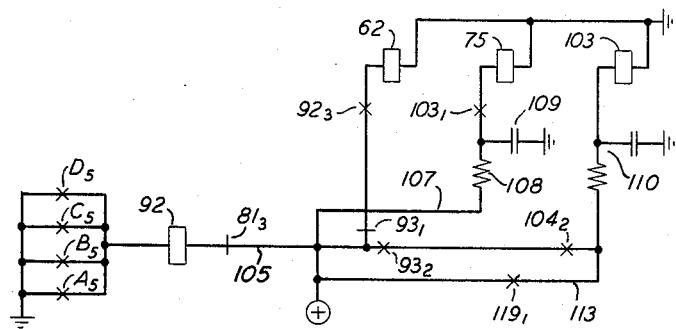
FIG. 7 shows one portion of the control circuitry governing the electromechanical arrangement of FIG. 3.

Pictured in FIG. 7 is a portion of the control circuitry which governs the rotation of drum 47. As shown in the drawing, solenoid 62 (also shown in FIG. 3), which controls drum rotation during an address selecting cycle, is connected in an operating path comprising a positive source of potential, break contacts $93_1$, make contacts $92_3$, the winding of solenoid 62 and ground. The operating path for relay 92, which serves to complete the operating path for solenoid 62 when any of the address selecting keys 6 is depressed, comprises the aforementioned positive source of potential, conductor 105, break contacts $81_3$ which in actuality comprise code wheel 81 and contact fingers 84, the winding of relay 92, shunt make contacts $A_5$, $B_5$, $C_5$ and $D_5$, and ground. Jaw clutch actuating solenoid 75 (also shown in FIG. 3), which in conjunction with solenoid 73 controls drum rotation during an information storage or extraction cycle, is situated in an operating path comprising the positive source of potential, conductor 107, current limiting resistor 108, shunt precharging capacitor 109, make contacts $103_1$ the winding of solenoid 75 and ground. Relay 103, the operation of which is delayed by integrating circuit 110, is energized by the positive source of potential through two parallel paths. The first path comprises make contacts $119_1$ which operates during a recording cycle after the drum is properly positioned at the selected address, and the second path comprises series make contacts $93_2$ and $104_2$ which establish a conduction path when the dialer is in the automatic dialing mode of operation and the drum has reached a selected address.

As was noted above, an integrating circuit 110 is provided to delay slightly the operation of relay 103 after its operating path has been established. The purpose of this delay is to prevent the actuation of the jaw clutch 71 (FIG. 3) until latch 61 operatively engages detent wheel 54, thereby arresting rotation of drum 47. From a practical standpoint latch 61, in order to engage a particular tooth of detent wheel 54, must be dropped slightly ahead of the desired tooth. If both the jaw clutch 71 were engaged and latch 73 were released precisely at the instant latch 61 were dropped, it would be entirely possible that the jaws of clutch 71 would enmesh before the drum reached the selected address, i.e., the actual position of the drum in such a case would lag the desired address. To prevent such a result, integrating circuit 110 is provided to delay the actuation of jaw clutch 71 until the desired tooth of the detent wheel has lockingly engaged the dropped latch 61, thereby insuring that the drum is at the selected address when the teeth of the jaw clutch enmesh.

Figure 8:
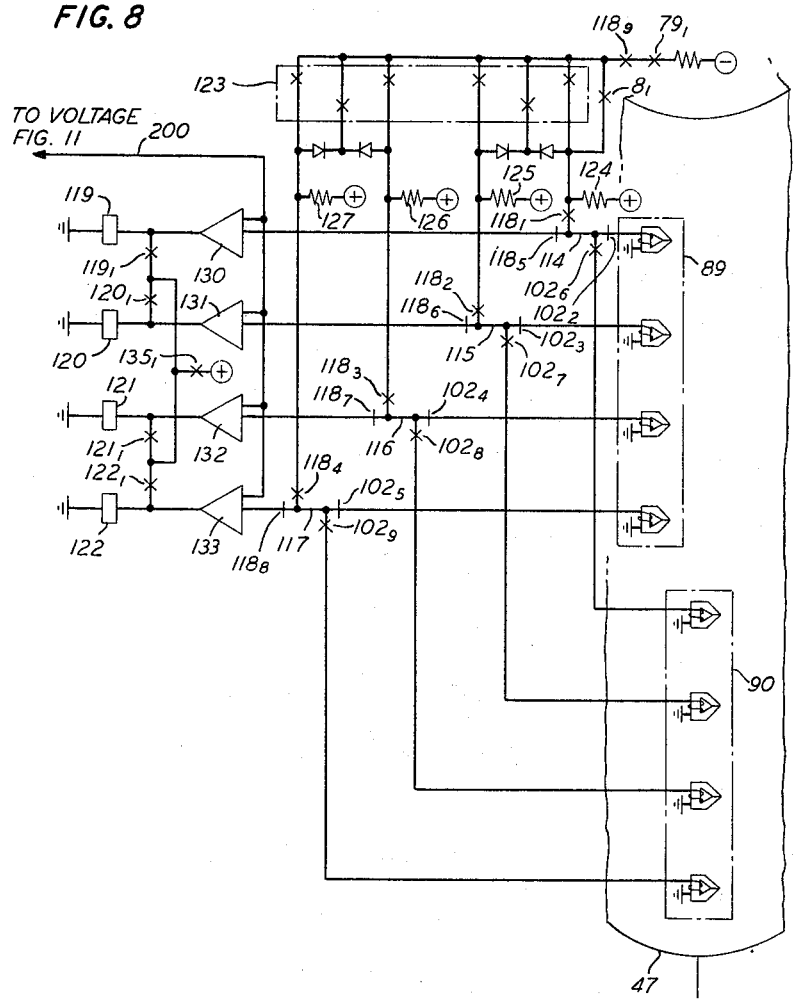
FIG. 8 shows a magnetic drum storage register.

FIG. 8 shows a register circuit capable of both storing coded dialing information on drum 47 in the form of magnetic saturation reversals, and extracting stored directory numbers to accomplish automatic dialing. The circuit arrangement of FIG. 8 is substantially similar to that disclosed in FIG. 3 in the previously cited Miller-Taris application, and consequently need not be redescribed in detail herein. The only significant difference between the electrical circuit arrangement of FIG. 8 and that of the Miller-Taris application is that the magnetic storage register of the present invention is dual channeled, and consequently includes two, rather than one, 4-element magnetic heads. Accordingly, a plurality of transfer contacts are provided comprising break contacts $102_2$ through $102_5$ which connect the four magnetic elements of head 89 to the information storage and extraction portion of the circuit when transfer relay 102 (FIG. 5) is de-energized, and make contacts $102_6$ through $102_9$ which act in complementary fashion with respect to the magnetic elements of head 90. In other words, the magnet elements of only one head are connected in operating relation with the remainder of the register circuitry at any instant of time.

With regard to the information storage and extraction circuitry of FIG. 8, suffice it to say that dialing information is magnetically recorded along the drum in a four-bit per dial digit code, which accounts for heads 89 and 90 having four magnetic elements each. Corresponding magnetic elements of heads 89 and 90 are joined together via the respective contacts $102_2$ through $102_9$ to form four separate conductors 114, 115, 116 and 117, each of which is associated with a different bit of the code. Conductors 114 through 117 connect the magnetic elements of heads 89 and 90 alternately to a set of decoding relays 119, 120, 121 and 122, each of which senses a different bit of the code, and to a switching matrix 123 which operates under the control of the pushbutton dial of FIG. 1 to apply erase and coding potentials to the drum.

When the repertory dialer is in the record mode of operation, that is to say, preparatory to storing a directory number, positive, or erase, potential which saturates the drum to one extreme is applied to the magnetic elements associated with the selected channel through resistors 124, 125, 126 and 127, make contacts $118_1$, $118_2$, $118_3$ and $118_4$, and conductors 114, 115, 116 and 117, respectively. As explained in the previously mentioned Miller-Taris application, the depression of a key 4 of the pushbutton dial (FIG. 1) selectively actuates pairs of make contacts of switching matrix 123. Make contacts $118_9$, since they are actuated by the same relay which actuates make contacts $118_1$ through $118_8$, are also actuated at this time. Accordingly, during the record mode of operation, negative, or coding, potential is selectively distributed to the magnetic elements of one of the heads in concurrence with the actuation of make contacts $79_1$. As a result, segments of the drum adjacent to certain ones of the magnetic elements are saturated in the reverse extreme so as to provide magnetic coding in the form of saturation reversals.

In accordance with one feature of the invention, make contacts $79_1$, which control the flow of negative coding current to the magnetic elements of heads 89 and 90, comprise the code wheel 79 with its embossed metallic pattern and sensing fingers 82, both of FIG. 3. As illustrated in the plan view of FIG. 9, code wheel 79 comprises a crown shaped portion 128 of electrically conductive material which is surrounded by insulating material 129 shown in stipple. Crown 128 comprises a lower portion in the form of a continuous band and an upper portion in the form of a square wave in which the width of the crests are equal to the widths of the troughs. As shown, one of the sensing fingers $82_f$ bears permanently against the lower, or continuous, portion of the crown, while the other finger $82_a$ bears against the toothed portion. Accordingly, as code wheel 79 revolves, the sensing fingers provide circuit closures when the upper finger $82_b$ engages a conductive portion of the crown, and provides a circuit breakage when the upper finger bears upon a portion of the insulating material. The spacing of the teeth of crown 128 is related to the reduction gear system of FIG. 3 such that for each $\frac{1}{25}$ revolution of drum 47 a sufficient number of circuit closures occur to record a complete telephone directory number. The section 150 on the crown in which no teeth are present represents the starting position of an address. Accordingly, the drum must rotate to tooth 151 before the first digit is recorded.

When the repertory dialer is in the "dial" mode of operation, that is to say, preparatory to automatic dialing a directory number, the magnetic elements of the selected head are coupled through break contacts $118_5$, $118_6$, $118_7$ and $118_8$, and amplifiers 130, 131, 132 and 133 to decoding relays 119, 120, 121 and 122 which actuate the various make and break contacts of switching matrices 22 and 46 of FIG. 2, thereby to activate the multifrequency dialing oscillator. Amplifiers 130 through 133 are enabled by the application of source potential via conductor 200. To insure that the dialing signals which are applied to the line via the multifrequency dialing oscillator are of uniform length, locking paths comprising make contacts $119_1$, $120_1$, $121_1$ and $122_1$ connect their respective coding relays to a positive source of potential through make contact $135_1$ for a timed interval determined by the circuit arrangement shown in FIG. 10. Accordingly, inaccuracies with respect to pulse length which may occur during the recording of a directory number do not adversely affect the pulse length of signals generated during an automatic dialing cycle.

Figure 10:
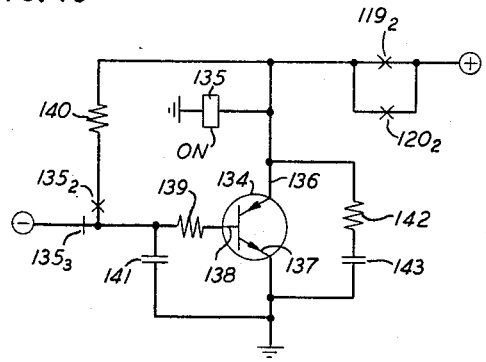
FIG. 10 is a timing circuit useful in the invention.

FIG. 10 shows a timing circuit comprising a control rectifier 134 having its anode electrode 136 connected to a positive source of potential through make contacts $119_2$ and $120_2$, its cathode electrode 137 connected to ground, and its gate electrode 138 connected to a negative source of potential through current limiting resistor 139 and break contacts $135_3$. As shown, a feedback path comprising resistor 140, make contacts $135_2$ and resistor 139 interconnect anode 136 and gate electrode 138. Resistor 139 and capacitor 141 connect gate electrode 138 to ground, and a charging circuit comprising series resistor 142 and capacitor 143 is connected between anode electrode 136 and ground. Relay 135 is connected between anode electrode 136 and ground.

In the quiescent condition of the FIG. 10 timing circuit, control rectifier 134 is nonconducting and capacitor 141 has charged to the value of the negative source of potential through break contacts $135_3$. When either coding relay 119 or 120 operates, which as explained in the aforementioned Miller-Taris application will occur each time a directory number is sensed by heads 89 or 90, one of the make contacts $119_2$ or $120_2$ will be actuated and apply charging potential to resistor 142 and capacitor 143. When a sufficient voltage is developed across capacitor 143, relay 135 operates, thereby actuating make contacts $135_2$ and break contacts $135_3$. Accordingly, capacitor 141 begins to charge through the operated one of make contacts $119_2$ and $120_2$, resistor 140 and make contacts $135_2$, and when the potential across capacitor 141 becomes sufficiently positive with respect to ground, control rectifier 134 switches into its conducting state. As a result, the potential at anode 136 of the control rectifier falls sharply toward ground, thereby de-energizing relay 135. When relay 135 releases, make contacts $135_1$ (FIG. 8) break the locking path for decoding relays 119 and 120, which then release and open make contacts $119_2$ and $120_2$. With the opening of make contacts $119_2$ and $120_2$ the source of positive potential is removed from anode 136, thereby causing control rectifier 134 to revert to its nonconducting state. It is evident from the foregoing that the timing period of the FIG. 10 circuit arrangement is determined primarily by the impedance parameters of resistor 140 and capacitor 141.

Figure 11:
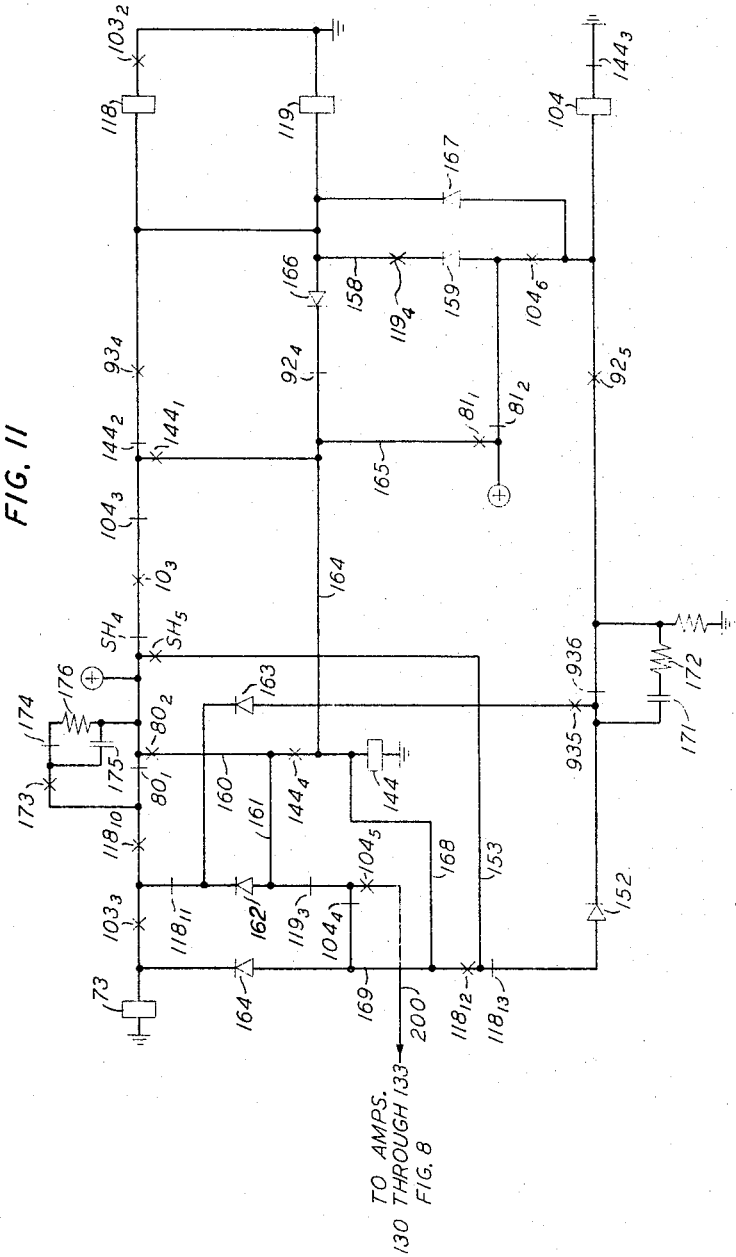
FIG. 11 shows the remaining control circuitry governing the electromechanical drum positioning arrangement of FIG. 3.

FIG. 11 is a schematic diagram of the remaining control circuitry for the repertory dialer. As shown in the upper right portion of the drawing, a pair of record relays 118 and 119 are connected in parallel branches which are energized from a positive source of potential through a series path comprising switchhook controlled break contacts $SH_4$, RECORD KEY controlled make contacts $10_3$, break contacts $104_3$ and $144_2$ and make contacts $93_4$. It will be observed that the parallel branch containing relay 118 includes an additional make contact $103_2$ which serves to delay the operation of relay 118 relative to relay 119 until the drum reaches the exact position of the selected address. A locking path for record relays 118 and 119 is provided through make contacts $119_4$, diode 159, break contacts $81_2$ and a positive source of potential. Solenoid 73 (FIG. 3), which causes drum 47 to rotate in step-by-step fashion during a recording cycle and continuously during an automatic dialing cycle, is connected to the aforementioned positive source of potential through several paths, one of which comprises make contacts $103_3$ and $118_{10}$, and break contacts $80_1$ (controlled by code wheel 80 and contact fingers 83), and another of which comprises break contacts $80_2$, conductors 160 and 161, diode 163, break contacts $118_{11}$ and make contacts $103_3$. Another path connecting positive potential to solenoid 73 comprises make contacts $SH_5$, conductor 153, break contacts $118_{13}$, diode 152, make contacts $93_5$, diode 163, break contacts $118_{11}$ and make contacts $103_3$. Still another path connecting positive potential to solenoid 73 comprises make contacts $80_2$, conductors 160 and 161, break contacts $119_3$ and $104_4$, and diode 164. A final path for energizing solenoid 73 comprises the positive source of potential, capacitor 175, make contacts 173, which are actuated by any of the keys of dialing array 4 (FIG. 1), and make contacts $118_{10}$ and $103_3$. Shunting capacitor 175 are break contacts 174, which are actuated by all of the keys of dialing array 4, and resistor 176.

FIG. 12 shows a plan view of code wheel 80 and its three associated contact fingers $83_a$, $83_b$ and $83_c$. The code wheel comprises an electrically conductive portion 146 disposed between insulating portions 147. Conducting portion 148 includes a rectangular step 148 projecting from its upper edge, and an identically sized rectangular notch 149 extending into its lower edge, the former being disposed directly above the latter. The portions of the contact fingers which bear upon the surface of the code wheel are arranged in alignment with each other, top finger $83_a$ being disposed to engage step 148, middle finger $83_b$ being disposed to engage the central portion of band 146, and bottom finger $83_c$ being disposed to engage notch 149. As is readily observed by reference to FIG. 9, tooth 148 and corresponding notch 149 are situated at the initial portion of an address. In other words, each time drum 47 reaches the beginning of an address, fingers $83_a$ and $83_b$ provide a circuit closure at break contact $80_1$, and at the same time fingers $83_b$ and $83_c$ provide a circuit breakage at make contacts $80_2$. When the drum rotates to the point where the first digit is to be recorded, the foregoing electrical situation is reversed and remains reversed until the drum once again resides at the beginning of an address.

In addition to record relays 118 and 119, which operate when the repertory dialer is placed in the record mode of operation, the control circuitry of FIG. 11 also includes a call relay 104 which operates when the dialer is placed in an automatic dialing mode of operation. As shown, call relay 104 is operated through a path comprising ground, break contacts $144_3$, the winding of relay 104, make contacts $92_5$, break contacts $93_6$, diode 152, break contacts $118_{13}$, conductor 153, make contacts $SH_5$ and the aforementioned positive source of potential. A locking path for relay 104 is provided through ground, break contacts $144_3$, the winding of relay 104, make contacts $104_6$, break contacts $81_2$ which are controlled by code wheel 81 and contact fingers 84, and a positive source of potential.

FIG. 13 shows a plan view of code wheel 81 and its three associated contact fingers $84_a$, $84_b$ and $84_c$. As was the case with the code wheels 79 and 80, code wheel 81 comprises a conducting band 154 situated between insulated regions 155 which are shown in stipple. Projecting from the upper edge of conducting band 154 is a step 156 of conducting material, and extending into the conducting band is a notch 157 of insulating material situated directly below step 156. As seen with respect to FIG. 9, step 156 and notch 157 are situated on code wheel 84 at a position corresponding to the end of an address. As shown, upper contact finger $84_a$ is positioned to engage step 156, middle contact finger $84_b$ is positioned to engage the central portion of conducting band 154, and lower contact finger $84_c$ is positioned to engage notch 157. Accordingly, contact fingers $84_a$ and $84_b$ constitute make contacts $81_1$, and contact fingers $84_b$ and $84_c$ constitute break contacts $81_2$. In the position shown, make contacts $81_1$ provide a circuit breakage while break contacts $81_2$ provide a circuit closure. When code wheel 84 rotates to a position in which contact fingers $84_a$ and $84_c$ engage step 156 and notch 157, respectively, the electrical condition of make and break contacts $81_1$ and $81_2$ are reversed.

The final relay of the control circuit of FIG. 11 is reset relay 144, the purpose of which is to release the repertory dialer from either the record or the automatic dialing mode of operation under certain specified conditions. A number of different paths are provided for energizing relay 144, each of which is established under a different circumstance. A first path for energizing relay 144, which is established when the drum 47 reaches the end of an address, comprises ground, the winding of relay 144, conductors 164 and 165, make contacts $81_1$ and a positive source of potential. A second path for energizing relay 144, which is established when the dialer is in the record mode of operation and the handset is removed from its cradle before a recording cycle has been completed, comprises ground, the winding of relay 144, conductor 164, break contacts $92_4$, diode 166, conductor 158, make contacts $119_4$, diode 159, break contacts $81_2$ and a positive source of potential. A third path for energizing relay 144, which is established when the dialer is in the automatic dialing mode of operation and the handset is replaced in its cradle before dialing is completed, comprises ground, the winding of relay 144, conductor 164, break contacts $92_4$, diodes 166 and 167, make contacts $104_6$, break contacts $81_2$ and a positive source of potential. A fourth path for energizing relay 144, which is established when the dialer is neither in the record nor the automatic dialing modes of operation but nevertheless drum 47 is not at the beginning of an address, comprises ground, the winding of relay 144, conductors 168 and 169, break contacts $104_4$ and $119_3$, conductors 161 and 160, make contacts $80_2$ and a positive source of potential. A fifth path for operating relay 144, which is established in the event that a subscriber recording a directory number attempts to continue recording digits after the full complement of digits has been recorded, comprises ground, the winding of relay 144, conductor 164, make contacts $144_1$, break contacts $104_3$, make contacts $10_3$, break contacts $SH_4$ and a positive source of potential.

The operation of the invention will now be described in detail.

Automatic dialing

When it is desired to dial an outgoing call automatically, the only steps necessary are to lift handset 2 from cradle arms 3, thereby actuating all of the switchhook (SH) contacts, and then to depress the particular address selecting key 6 associated with the party to whom the call is being placed. For purposes of illustration, assume that it is desired to place a call to the party associated with the uppermost key 6 (FIG. 1) in the left-hand column, in this case the key labeled "DOCTOR." As seen from FIG. 6, the particular key 6 in question is associated with positioning relays A and I of FIG. 5. Accordingly, when the upper left-hand key 6 is depressed, relays A and I are energized through a path comprising positive source of potential, make contacts $SH_6$, break contacts $118_{14}$ and $92_1$, conductor 96, diode 95, the winding of relay A, the contacts of the particular key 6 which is labeled A–I, the winding of relay I, diode 97, conductor 98, break contacts $92_2$ and a negative source of potential. When relays A and I are energized, make contacts $A_3$, $A_4$, $I_5$ and $I_6$ operate to establish a locking path for the A and I relays through the aforementioned positive source of potential, make contacts $SH_6$, break contacts $118_{14}$, conductor 99, make contacts $A_3$, the winding of the A relay, make contacts $A_4$, conductor 100, make contacts $I_5$, the winding of the I relay, make contacts $A_6$, conductor 101 and the aforementioned negative source of potential.

When any of the A, B, C or D positioning relays are energized, in this instance the A relay, relay 92 (FIG. 7) is energized through a path comprising a positive source of potential, conductor 105, break contacts $81_3$, the winding of relay 92, makes contacts $A_5$ and ground. Thereafter, relay 104 (FIG. 11), which controls the automatic dialing mode of operation, is energized through a path comprising ground, break contacts $144_3$, the winding of relay 104, make contacts $92_5$, break contacts $93_6$, diode 152, break contacts $118_{13}$, conductor 153, make contacts $SH_5$ and a positive source of potential. A path comprising capacitor 171 and resistor 172 is bridged across break contacts $93_6$ to permit relay 104 to be energized in the event that the drum 47 resides at the selected address when a key 6 is depressed. In such a case, relay 93 (FIG. 4) would operate immediately and open break contacts $93_6$.

According to the invention, when relays A and I are energized, an operating path for relay 93 (FIG. 4) is prepared through commutator segment $a$ and make contacts $I_1$ and $A_1$. However, this operating path is not completed until wiper arm 91 is swept around into contact with commutator segment $a$. It will be observed from FIG. 7 that before relay 93 is energized, that is to say, with arm 91 located in the position shown in FIG. 4, an operating path for solenoid 62 is established through ground, the winding of solenoid 62, make contacts $92_3$, break contacts $93_1$ and a positive source of potential. Accordingly, solenoid 62 (FIG. 3) pivots latch 61 out of engagement with detent wheel 54, thereby permitting shaft 55 to be driven through slip clutch 53 by motor 49, pinion 51 and gear 52. As a result, arm 56 is rotated by shaft 55 in a clockwise direction, thereby concurrently rotating drum 47 under the action of pins 57 and 58. When drum 47 has been rotated to the position where the starting point of the selected address resides under its associated head 89 or 90, wiper arm 91 engages the particular commutator segment associated with that address, segment $a$ here. Accordingly, relay 93 is energized via a path comprising ground, wiper arm 91, commutator segment $a$, make contacts $I_1$ and $A_1$, the winding of relay 93 and a positive source of potential. As a result, break contacts $93_1$ are actuated to interrupt the operating path of solenoid 62, whereupon latch 61 under the action of spring 63 re-engages detent wheel 54 to arrest further rotation of shaft 55 and drum 47.

After the energization of relay 93, an operating path for relay 103 (FIG. 7) is established comprising ground, the winding of relay 103, delay circuit 110, make contacts $104_2$ and $93_2$ and the positive source of potential. Due to the presence of delay circuit 110, however, relay 103 does not operate immediately, but rather is delayed slightly to permit proper meshing of the jaws of clutch 71. More specifically, in order for latch 61 to engage the particular tooth of detent wheel 54 associated with the selected address, it is necessary to relase the latch slightly before that tooth arrives at the engagement position. In other words, relay 62 first releases latch 61, and thereafter, detent wheel 54 continues to rotate until a tooth engages the latch. Jaw clutch 71, however, through which rotation of the drum 47 is continued after the selected address position has been reached, must not be engaged until latch 61 has engaged the tooth on detent wheel 54 corresponding to the selected address. Accordingly, circuit 110 (FIG. 7) provides sufficient delay between the release of solenoid 62 and the operation of solenoid 75 to permit latch 61 to become fully engaged with the proper tooth of detent wheel 54.

As seen from FIG. 7, capacitor 109 is normally fully charged to the potential of the positive source through conductor 107 and resistor 108. Accordingly, after relay 103 operates, jaw clutch solenoid 75 operates rapidly owing to the discharge of capacitor 109 through make contacts $103_1$, the winding of solenoid 75 and ground. Thereafter solenoid 75 is maintained operated by the positive source of potential connected through conductor 107 and resistor 108 rather than by capacitor 109.

Concurrent with the engagement of jaw clutch 71 under the action of jaw clutch solenoid 75, an energizing path for solenoid 73 (FIGS. 3 and 11) is established comprising positive source of potential, make contacts $SH_5$, conductor 153, break contacts $118_3$, diode 152, make contacts $93_5$, diode 163, break contacts $118_{11}$, make contacts $103_3$, the winding of solenoid 73 and ground. Consequently, latch 72 disengages from detent wheel 66 under the action of solenoid 73. Thereafter, drum 47 is driven in rotation by motor 49 through slip clutch 65, the reduction gear system comprising gears 67 through 70, and jaw clutch 71. It will be observed that as drum 47 rotates under action of motor 49, arm 56 remains stationary owing to the engagement of latch 61 with detent wheel 54. Accordingly, as the drum rotates, spring 59 is placed in tension by pin 60.

As is indicated in FIGS. 9, 12 and 13, the reduction gear system comprising gears 67 through 70 is dimensioned with respect to the circumference of code wheels 79, 80 and 81 such that rotation of the drum through one complete address, i.e., 14.4 degrees along the drum, corresponds to a 360 degree rotation of the code wheels. In addition, the system is so arranged, as will be described hereinafter, such that all of the sensing fingers associated with the various code wheels reside in the positions shown in FIGS. 9, 12 and 13 when the drum is positioned at the start of an address. It will be observed from FIG. 12 that at the start of an address, fingers $83_b$ and $83_c$, which together form make contacts $80_2$, do not yet provide a closed circuit condition. Accordingly, the path for applying source voltage to detecting amplifiers 130 through 133, which path is shown in FIG. 11 as comprising positive source of potential, make contacts $80_2$, conductors 160 and 161, break contacts $119_3$ and make contacts $104_5$, is not yet established. Only after drum 47 has been rotated to a point just short of the first recorded digit, which corresponds to the position of tooth 151 of FIG. 9, do contact fingers $83_b$ and $83_c$ both engage conducting band 146 and thereby establish a path for enabling detecting amplifiers 130 through 133. Thereafter, as the drum continues to rotate, coded digits are sensed by the magnetic elements of head 89 and applied via break contacts $102_2$, $102_3$, $102_4$ and $102_5$, break contacts $118_5$, $118_6$, $118_7$ and $118_8$, and amplifiers 130, 131, 132 and 133, to relays 119, 120, 121 and 122.

As combinations of relays 119 through 122 operate in response to the detection of coded digits by the magnetic elements of head 89, the various make and break contacts of switching matrices 22 and 46 (FIG. 2) are operated, as described in the aforementioned Miller-Taris application, and actuate the multifrequency oscillator in accordance with the recorded information. As was previously described, the timing circuit of FIG. 10 insures that relays 119 through 122 remain operated for precisely timed intervals, thereby providing multifrequency dialing digits of uniform length regardless of nonuniformities in the recorded digits.

It is observed from FIG. 13 that as drum 47 rotates to the end of a selected address, contact finger $84a$ engages step 156, and contact finger $84c$ engages notch 157. Accordingly, contact fingers $84a$ and $84b$, which together form make contacts $81_1$, provide a circuit closure, and conversely, contact fingers $84b$ and $84c$, which together form break contacts $81_2$ and $81_3$, provide two circuit breakages only one of which is shown. Each of the contact fingers $84b$ and $84c$ includes split, insulatedly separated portions which, although not shown, are indicated schematically by labeling the combination of these two contact fingers both as contacts $81_2$ and as $81_3$. Thereafter the locking path for relay 104, which includes break contacts $81_2$, is interrupted, thereby releasing relay 104. At the same time an operating path for relay 144 is established comprising ground, the winding of relay 144, conductors 164 and 165, make contacts $81_1$ and positive source of potential.

When relay 104 is released, the operating path for relay 103 (FIG. 7) is interrupted owing to the opening of make contacts $104_2$. Accordingly, relay 103 releases and in so doing interrupts the operating path for jaw clutch solenoid 75. Consequently, the jaws of clutch 71 are separated under the urging of a return spring, and drum 47 is rotated back to the start of the selected address by spring 59. As indicated above, break contacts $81_2$ and $81_3$ emanate from the same contact fingers, and consequently provide circuit breakages at identical times. Accordingly, when break contacts $81_2$ interrupt the locking path for relay 104, break contacts $81_3$ interrupt the operating path for relay 92 (FIG. 7). At this same time, make contacts $81_1$, which operate in a converse fashion to break contacts $81_2$ and $81_3$, establish an operating path for solenoid 73 comprising ground, the winding of solenoid 73, diode 164, conductors 169, 168, 164 and 165, make contacts $81_1$ and positive source of potential. As a result, latch 72 remains disengaged from detent wheel 66 and code wheels 79, 80 and 81 continue to rotate independently of drum 47.

After sensing finger $84a$ has traversed step 156 of code wheel 81, make contacts $81_1$ once again open to interrupt the operating path for solenoid 73. Thus, even though break contacts $80_1$ provide a circuit closure at this time, nevertheless, make contacts $103_3$ do not provide a circuit closure and therefore solenoid 73 is de-energized. As a result, latch 72 is urged into engagement with detent wheel 56 by return spring 74, but detent wheel 66 is so aligned with respect to code wheel 80 that latch 72 falls within toothless region 170. The aforementioned toothless region is so designed that when latch 72 engages the first tooth bordering the toothless region, the various contact fingers are disposed on the code wheels in the position shown in FIGS. 9, 12 and 13. In this manner the code wheels are always returned to the proper position for the start of an automatic dialing or a recording cycle.

In the event that the selected address resides in the channel of drum 47 which is associated with head 90 rather than head 87, the operation of the dialer is substantially the same as that outlined above, except that relay 94 (FIG. 5) is energized along with a pair of positioning relays. As a result, an operating path for relay 102 is established comprising ground, make contacts $94_1$, the winding of relay 102, make contacts $SH_3$ and a positive source of potential. After relay 102 is energized, make contacts $102_1$ operate to complete a locking path for this relay. Consequently, as is observed from FIG. 8, the magnetic elements of head 90 are coupled to decoding relays 119, 120, 121 and 122 through make contacts $102_6$, $102_7$, $102_8$ and $102_9$, while the magnetic elements of head 89 are decoupled from the aforementioned decoding relays by break contacts $102_2$, $102_3$, $102_4$ and $102_5$.

If handset 2 is returned to its cradle 3 before dialing is completed, circuitry is provided for reverting the dialer to its normal condition. More specifically, if the switchhook mechanism is operated before drum 47 reaches the selected address, make contact $SH_3$ (FIG. 5) provide a circuit breakage to interrupt the locking path for relay 102, and make contacts $SH_6$ provide a circuit breakage to interrupt the locking paths for the positioning relays A through D and I through VI. Accordingly, the operated one of make contacts $A_5$ through $D_5$ (FIG. 7) open and de-energize relay 92. As a result, make contacts $92_3$ are opened to de-energize solenoid 62, whereupon latch 61 is pivoted under the action of spring 63 into re-engagement with detent wheel 54. Also, a path for energizing relay 144 (FIG. 11) is established comprising ground, the winding of relay 144, conductor 164, break contacts $92_4$, diodes 166 and 167, make contacts $104_6$, break contacts $81_2$ and a positive source of potential. When relay 144 is energized, break contacts $144_3$ are actuated and provide a circuit breakage to interrupt the operating path for relay 104. When relay 104 is de-energized, make contacts $104_6$ open to interrupt the aforementioned operating path of relay 144. In this manner, the control circuitry of the dialer is reverted to the condition in which it resided prior to the initiation of dialing.

If handset 2 is returned to cradle 3 while dialing is in progress, that is to say, after drum 47 has reached the selected address but before dialing is completed, relay 102 (if operated), the locked ones of positioning relays A through D and I through VI, relay 92 and relay 104 are de-energized in the manner previously described. Since relay 104 is de-energized, make contacts $104_2$ are open to interrupt the operating path of relay 103. As a result, make contacts $103_1$ interrupt the operating path of jaw clutch solenoid 75, and the jaws of clutch 71 separate. Thereafter, drum 47 is returned to the start position of the selected address under the action of spring 59. However, since contact finger $83_c$ (FIG. 12) is in engagement with conducting band 146 at this time, make contacts $80_2$ (FIG. 11) provide an operating path for solenoid 73 comprising ground, the winding of solenoid 73, diode 164, break contacts $104_4$ and $119_3$, conductors 161 and 160, make contacts $80_2$ and a positive source of potential. Accordingly, code wheels 79, 80 and 81 continue to be rotated through slip clutch 65 until contact finger $83_c$ engages insulating notch 149, at which point solenoid 62 is de-energized and latch 73 is urged toward detent wheel 66. As explained above, latch 72 falls into toothless region 170, allowing the code wheels to continue rotation until the position of FIGS. 9, 12 and 13 is assumed. The dialer is now in the same condition as before dialing was commenced.

Recording

In order to record a directory number at a selected address, RECORD key 10 (FIG. 1) is first depressed and held, the address selecting key 6 associated with the address in which the directory number is to be recorded is then depressed, and after the drum has reached the selected address, the directory number is recorded by selectively depressing dialing keys 4. Throughout a recording operation, handset 2 remains in its cradle 3 and RECORD key 10 is held depressed.

For purposes of illustration, assume a directory number is to be stored in the address on drum 47 associated with the key 6 of FIG. 5 labeled "D–VI." When RECORD key 10 and the D–VI key are depressed, a path is established for energizing relays D and VI comprising positive source of potential, break contacts $SH_7$, make contacts $10_4$, break contacts $92_1$, diode 95, the winding of relay D, the contacts of the D–VI key, the winding of relay VI, diode 97, break contacts $92_2$ and negative source of potential. Accordingly, make contacts $D_4$, $D_3$, $VI_5$ and $VI_6$ operate and provide locking paths for relays D and VI in the same manner as during automatic dialing. Also, as was the case during automatic dialing, the energization of selected pairs of positioning relays both establishes an operating path for relay 92 (FIG. 7) through make contacts $D_5$, and prepares an operating path for relay 93 (FIG. 4) through commutator segment $x$ and make contacts $VI_4$ and $D_1$. Thereafter, make contacts $92_3$ are actuated to energize solenoid 62 (FIG. 7) which serves to disengage latch 61 from detent wheel 64 and permit drum 47 to be rotated to the selected address through slip clutch 53. When wiper arm 56, represented in FIG. 4 as arm 91, reaches commutator segment $x$, the operating path for relay 93 is completed. Consequently, break contacts $93_1$ open to interrupt the operating path of solenoid 62, whereupon latch 61 under the action of spring 63 re-engages detent wheel 54 to terminate the rotation of drum 47 at the start of the selected address.

When relay 93 operates, make contacts $93_4$ (FIG. 11) are actuated to prepare an operating path for relays 118 and 119 comprising positive source of potential, break contacts $SH_4$, make contacts $10_3$, break contacts $104_3$ and $144_2$ and make contacts $93_4$. Relay 119 is energized at this time, but not relay 118 owing to the presence of make contacts $103_2$. When relay 119 operates, a current path for relay 103 (FIG. 7) is established comprising ground, the winding of relay 103, delay circuit 110, conductor 113, make contacts $119_1$ and positive source of potential. After a short delay, due to circuit 110, relay 103 is energized, which results in the operation of jaw clutch solenoid 75 and relay 118. It will be recalled from the automatic dialing mode of operation that relay 93 is energized shortly before drum 47 reaches the selected address so that latch 61 will be released before the tooth of detent wheel 54 associated with the selected address reaches the released latch. As a result, the address adjacent the one selected under a magnetic head when relay 93 operates. It will be observed from FIG. 8 that erase currents from positive sources of potential are applied to the magnetic element of the heads 89 and 90 through make contacts $118_1$, $118_2$, $118_3$ and $118_4$ which are actuated by relay 118. Accordingly, one purpose for delaying the operation of relay 118 until relay 103 operates is to prevent erasure of recorded digits in an address other than the one selected.

It is seen from FIG. 12 that with drum 47 positioned at the start of the selected address, contact finger $83a$ engages step 148, thereby providing a circuit closure through break contacts $80_1$. Accordingly, solenoid 73 (FIG. 11) is energized through break contacts $80_1$, make contacts $118_{10}$ and $103_3$, thereby disengaging latch 72 from detent wheel 66. Thereafter, drum 47 and code wheels 79, 80 and 81 advance to a position in which contact finger $82a$ (FIG. 9) is just short of step 151, at which point break contacts $80_1$ (FIG. 12) open once again to de-energize solenoid 73 and arrest further rotation. When any of the keys 4 of the dialing array (FIG. 1) are depressed, solenoid 73 is re-energized through a path comprising positive source of potential, capacitor 175, make contacts 173, $118_{10}$ and $103_3$. However, solenoid 73 remains operated only momentarily until capacitor 175 becomes fully charged. In other words, latch 72 is disengaged from detent wheel 66 to allow rotation of the code wheels and drum 47, but is released in time for the latch to re-engage the detent wheel at the next succeeding tooth. The spacing of teeth 151 (FIG. 9) is so related to the design of detent wheel 66 that as the detent wheel rotates one tooth, contact finger $82_a$ traverses a single one of the teeth 151 of code wheel 79.

It is seen from FIG. 8 that positive, or erase, current is applied to the magnetic elements of the enabled head, 89 or 90, through resistors 124, 125, 126 and 127 and make contacts $118_1$, $118_2$, $118_3$ and $118_4$. As explained in the aforementioned Miller-Taris application, the depression of the various keys 4 of the dialing array actuates the switches of matrix 123 in unique combinations according to which key 4 is depressed. Accordingly, each time a key 4 of the dialing array is depressed, drum 47 is rotated through an angle corresponding to one tooth of detent wheel 66, and make contacts $79_1$ provide a single momentary circuit closure owing to contact finger $82a$ (FIG. 9) traversing a single step 151. As a result, each time a key 4 of the dialing array is depressed, momentary surges of negative, or write, current flows through the magnetic elements of the enabled head in coded groups depending upon which key 4 of the dialing array is depressed.

When a complete directory number has been stored on drum 47, the subscriber releases RECORD key 10. At this time the drum and code wheels have advanced to a position in which contact fingers $84a$ and $84c$ (FIG. 13) engage conducting step 156 and insulating notch 157, respectively. Consequently, make contacts $81_1$ (FIG. 11) close to operate relay 144 via conductors 165 and 164, and break contacts $81_2$ open to interrupt the operating path for relays 118 and 119. Thereafter, drum 47 and code wheels 79, 80 and 81 are returned to their start-address positions and the dialer returned to a neutral condition in the same manner as described above in connection with the completion of an automatic dialing cycle.

In the event that a subscriber maintains RECORD key 10 depressed and mistakenly attempts to continue recording digits after a complete directory number has been recorded, the dialer does not respond. As explained above, after a complete digit has been recorded, relay 144 is energized. Accordingly, make contacts $144_1$ close to maintain relay 144 operated for so long as the RECORD key 10 remains depressed, and break contacts $144_2$ open to prevent the subsequent re-energization of relays 118 and 119. As a result, further depression of keys 4 of the dialing array are totally ineffective to perform their recording function inasmuch as relays 118 and 119, which control the record activity of the dialer, are de-energized. As soon as RECORD key 10 is released, the operating path for relay 144 through make contacts $144_1$ is interrupted, but relay 144, and also solenoid 73, are maintained operated through make contacts $80_2$ and $144_4$. Accordingly, the code wheels are rotated back to the positions shown in FIGS. 9, 12 and 13, whereupon make contacts $80_2$ open and release relays 144 and solenoid 73.

Conversely, if a subscriber desires to terminate a recording cycle prior to the recordation of a complete digit, RECORD key 10 is released, whereupon make contacts $10_4$ (FIG. 5) open to de-energize the operated ones of positioning relays A through D and I through VI. As a result, the operated one of make contacts $A_5$ through $D_5$ (FIG. 7) opens to interrupt the operating path of relay 92. Accordingly, an operating path for relay 144 is established comprising ground, the winding of relay 144, conductor 164, break contacts $92_4$, diode 166, make contacts $119_4$, diode 159, break contacts $81_2$ and a positive source of potential. Thereafter, solenoid 73 is maintained energized through a path comprising ground, the winding of solenoid 73, diode 164, conductors 169, 168 and 164, break contacts $92_4$, diode 166, conductor 158, break contacts $119_4$, diode 159, break contacts $81_2$ and a positive source of potential. When the drum reaches the end of the selected address, break contacts $81_2$ open to interrupt the operating path for relays 118 and 119. Consequently, make contacts $119_1$ (FIG. 7) open to de-energize relay 103, which in turn opens make contacts $103_1$ to de-energize solenoid 75. Thereafter, the jaws of clutch 71 separate, allowing the drum to be returned to the start-address position under action of spring 59. Code wheels 79, 80 and 81 are then returned to their start-address position in the same manner as when a normal recording cycle is completed.

It is to be understood that although only a single embodiment of the invention has been described herein, many variations, modifications and adaptations may be derived without departing from the spirit and scope of the invention.

What is claimed is:

1. In a telephone repertory dialer, apparatus for selectively acquiring access to a directory number storage register comprising, in combination, a motor, a shaft mounted for rotation, a clutch, said motor being arranged to drive said shaft through said clutch, a ratchet wheel mounted on said shaft, a latch mounted in holding engagement with said ratchet wheel, a directory number storage register, means coupling said register to said shaft for rotation, a plurality of manually operable switches, each of said switches corresponding to a particular rotational position of said register, means responsive to the operation of any of said switches for disengaging said latch from said ratchet wheel, thereby to initiate rotation of said shaft, commutator means comprising a plurality of contact members and further comprising an arm concurrently rotatable with said shaft, said contact members respectively corresponding to said switches, and said arm being positioned to sequentially engage said contact members during rotation, and means including said commutator means for causing said latch to holdingly re-engage said ratchet wheel when said arm engages a contact member corresponding to an operated switch, thereby to terminate rotation of said shaft.

2. Apparatus in accordance with claim 1 wherein said means coupling said register to said shaft for rotation comprises a first pin fixed to said arm and a second pin fixed to said register, said first pin being positioned to drivingly engage said second pin, a third pin connected to said register, and a spring connected in tension between said first and third pins, thereby to tension said first pin against said second pin.

3. A telephone repertory dialer including a motor, first and second shafts mounted for rotation, first and second clutches, said motor being arranged to drive said first and second shafts in rotation through said first and second clutches, respectively, first and second ratchet wheels respectively mounted on said first and second shafts, first and second latches respectively disposed in holding engagement with said first and second ratchet wheels, a plurality of manually operable switches, each of said switches corresponding to a particular rotational position of said first shaft, means responsive to the operation of any of said switches for disengaging said first latch from said first ratchet wheel, thereby to initiate rotational movement of said first shaft, means for sensing the rotational position of said first shaft, means responsive to said sensing means for re-engaging said first latch to said first ratchet wheel when said first shaft rotates to a position corresponding to an operated one of said switches, thereby to terminate rotation of said first shaft, a storage register, means mounting said register for rotation, means for rotating said register concurrently with the rotation of said first shaft, an engagable clutch associated with said second shaft, said register connected for rotation by said second shaft when said last-mentioned clutch is engaged, and means for concurrently engaging said last-mentioned clutch and disengaging said second latch from said second ratchet wheel after said first shaft reaches said position corresponding to an operated one of said switches, thereby to rotate said register.

4. A telephone repertory dialer comprising, in combination, storage means mounted for rotation, at least one information transfer head associated with said storage means, said head being positioned to interrogate said storage means, a plurality of manually operable switches, each of said switches corresponding to a particular rotational position of said storage means, means for driving said storage means in rotation, means responsive to the operation of any of said switches for initiating rotation of said storage means, detector means for sensing the rotational position of said storage means, means responsive to said detector means for terminating rotation of said storage means, and means also responsive to said detector means for reinitiating rotation of said storage means for a predetermined rotational angle.

5. A telephone repertory dialer comprising, in combination, a magnetic storage drum mounted for rotation, at least one information transfer head positioned fixedly to interrogate said drum, a plurality of manually operable key switches, each of said switches corresponding to a particular rotational position of said drum, means for driving said drum in rotation, means responsive to the operation of any of said switches for initiating rotation of said drum, commutator means for sensing the rotational position of said drum, means for terminating the rotation of said drum when said commutator means senses a rotational position corresponding to an operated one of said switches, and means operative after said commutator means senses a rotational position corresponding to an operated one of said switches for reinitiating rotation of said drum through a predetermined angle.

6. A telephone repertory dialer comprising, in combination, a magnetic storage drum mounted for rotation, at least one information transfer head positioned fixedly to interrogate said drum, a record key, a dialing mechanism, a plurality of manually operable key switches, each of said switches corresponding to a particular rotational position of said drum, means for driving said drum in rotation, means responsive to the operation of any of said switches for initiating rotation of said drum, commutator means for sensing the rotational position of said drum, means for terminating the rotation of said drum when said commutator means senses a rotational position corresponding to an operated one of said switches, means for reinitiating rotation of said drum through a predetermined angle after said commutator means senses a rotational position corresponding to an operated one of said switches, and means responsive to the actuation of both said record key and said dial mechanism for stepping said drum in rotation.

7. In a telephone repertory dialer including a magnetic drum storage register mounted for rotation, at least one information transfer head, and means for selectively rotating said drum to a plurality of home positions which correspond to the addresses of telephone directory numbers stored in said drum, control means for rotating said drum through a predetermined angle past a home position and for energizing said heads to store directory number information in said drum during said rotation past home of said drum, said control means comprising code wheels mounted for rotation, means for rotating said code wheels correlatively with said drum, coded patterns of electrically conductive material affixed to said wheels, said patterns being respectively configured to describe the rotation of said drum beyond said home position and the energization of said heads, electrically conductive fingers disposed to engage said patterns, and said control means further including means responsive to the engagement of said fingers with said patterns for regulating the rotation of said drum beyond a home position and the energization of said heads.

References Cited by the Examiner
UNITED STATES PATENTS 2,270,176  1/1942  Van Lammeren et al.
334—29 X KATHLEEN H. CLAFFY, *Primary Examiner.*

S. J. BOR, *Assistant Examiner.*